United States Patent
Janke et al.

(10) Patent No.: US 8,005,674 B2
(45) Date of Patent: Aug. 23, 2011

(54) DATA MODELING OF CLASS INDEPENDENT RECOGNITION MODELS

(75) Inventors: Eric W Janke, Winchester (GB); Bin Jia, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1077 days.

(21) Appl. No.: 11/775,251

(22) Filed: Jul. 10, 2007

(65) Prior Publication Data

US 2008/0126094 A1    May 29, 2008

(30) Foreign Application Priority Data

Nov. 29, 2006 (GB) .................................. 0623932.1

(51) Int. Cl.
  *G10L 15/06* (2006.01)
  *G10L 15/10* (2006.01)
  *G10L 15/14* (2006.01)
(52) U.S. Cl. .................. 704/238; 704/234; 704/250
(58) Field of Classification Search .................. 704/238, 704/240, 243, 245, 246, 249, 218, 250
  See application file for complete search history.

(56) References Cited

U.S. PATENT DOCUMENTS

| | | | | |
|---|---|---|---|---|
| 5,953,701 A * | 9/1999 | Neti et al. | ...................... | 704/254 |
| 6,073,096 A * | 6/2000 | Gao et al. | ...................... | 704/245 |
| 6,107,935 A * | 8/2000 | Comerford et al. | .......... | 340/5.52 |
| 6,304,841 B1 * | 10/2001 | Berger et al. | ...................... | 704/2 |
| 6,567,776 B1 * | 5/2003 | Chang et al. | ................... | 704/236 |
| 6,999,925 B2 * | 2/2006 | Fischer et al. | ................. | 704/243 |
| 7,092,888 B1 * | 8/2006 | McCarthy et al. | ............. | 704/277 |
| 7,373,291 B2 * | 5/2008 | Garst | ................................. | 704/4 |
| 7,412,386 B2 * | 8/2008 | Janke et al. | ...................... | 704/254 |
| 7,590,537 B2 * | 9/2009 | Kim et al. | ...................... | 704/245 |
| 7,620,547 B2 * | 11/2009 | Kompe et al. | ...................... | 704/245 |
| 7,739,286 B2 * | 6/2010 | Sethy et al. | ................... | 707/737 |
| 7,752,046 B2 * | 7/2010 | Bacchiani et al. | ............. | 704/245 |
| 2005/0049872 A1 | 3/2005 | Dharanipragada et al. | | |
| 2005/0137866 A1 * | 6/2005 | Dow et al. | ...................... | 704/244 |

OTHER PUBLICATIONS

"Cross entropy", definition from Wikipedia, downloaded Apr. 1, 2011, 2 Pages.*
"Kullback-Leibler divergence", definition from Wikipedia, downloaded Apr. 1, 2011, 10 Pages.*

* cited by examiner

*Primary Examiner* — Martin Lerner
(74) *Attorney, Agent, or Firm* — Yee & Associates, P.C.; David A. Mims, Jr.

(57) ABSTRACT

A recognition model set is generated. A technique is described to take advantage of the logarithm likelihood of real data for cross entropy to measure the mismatch between a training data and a training data derived model, and compare such type of mismatches between class dependent models and class independent model for evidence of model replacement. By using change of cross entropies in the decision of adding class independent Gaussian Mixture Models (GMMs), the good performance of class dependent models is largely retained, while decreasing the size and complexity of the model.

18 Claims, 4 Drawing Sheets

DATA MODELING OF CLASS INDEPENDENT RECOGNITION MODELS

FIELD OF THE INVENTION

The present invention relates data models, and more particularly to class dependent data models used in recognition systems.

BACKGROUND

Speech recognition is the process by which computers analyze sounds and attempt to characterize them as particular letters, words, or phrases. Generally, a speech recognition system is "trained" with many phoneme examples. A phoneme is a basic unit of sound in a given lexicon. For example, it is generally agreed that the English language possesses approximately 50 unique phonemes. Each phoneme may include several variations in its pronunciation, referred to as allophones. In the example speech recognition system there are approximately 700 allophones. FIG. 1 shows two sets of training data (22A, 24A) and resulting data model set for the prior art and the embodiments of the invention. In FIG. 1, diagonally shaded circles represent phonemes 20A grouped into two sets 22A and 24A. A single set 26A groups all phonemes and both sets 22A and 24A.

A speech recognition system examines various features from each allophone example by mathematically modelling its sounds on a multidimensional landscape using multiple Gaussian distributions. Models of the allophones or at least close representations of the allophones are represented by shaded circles such as 20B. These are referred to as allophone models but could equally be called acoustic models, phoneme models, data models, or models in the description. Models 20B are grouped into two sets 22B (vertically shaded models) and 24B (horizontally shaded models) corresponding to original sets of phonemes 22A and 24A. A single set 26B groups class independent models (dotted shading) of all the allophones, that is, within the set 26A.

Once allophone models of allophones are created, input speech to be recognized is sliced into small samples of sound. Each sample is converted into a multidimensional feature vector by analyzing the same features as previously used to examine the allophones. Speech recognition is then performed by statistically matching the feature vector with the closest allophone model. Thus, the accuracy, or word error rate (WER), of a speech recognition system is dependent on how well the allophone models of allophones represent the sound samples input by the system.

Class dependent models based on single class training data are generally known to get better classification accuracy than the class independent allophone models based on all-class training data. In the circumstances of speech recognition, separate class dependent female and male allophones model sets, can yield improved recognition accuracy over a set of class (in this case gender) independent allophone models. There are two categories of existing methods to make use of class specific allophone models. One use of such models is to build one system with just female models and one system with just male models. At test time, samples are decoded using both systems in a two-pass approach. While such class specific systems provide better speech recognition results, they generally require too much computing power and resources to be practical in many real-world applications. The other category of method is based on a "determining" operation which determines if there is a difference in model information is between the female model and the male model. If the difference in model information is insignificant, a "training" operation creates an independent allophone model based on the female set of training data and the male set of training data when female and male models are replaced with class independent models, the computation and resources required can be substantially reduced. However the difference in the model information between the two class specific models does not reflect the change of model likelihood, which directly influences the recognition accuracy.

U.S. patent publication 2005/0049872 discloses measuring the difference between one class specific allophone model and another class specific allophone model and to replace them both with a single class independent model when the difference in allophone space is small. The difference is called the Kullback Leibler distance. See FIG. 1, where a resultant model set contains a combination of class independent models (dotted) and class dependent models (horizontally and vertically shaded). This method has some shortcomings. Firstly, since the decision to replace takes no account of whether the replacement model is suitable when replacing, the replacement can have a negative impact on recognition accuracy. Secondly, Kullback Leibler distance requires a Monte Carlo method for the calculation, which in turn requires generation of pseudo samples. If the number of samples is small, then the calculation is not reliable; if the number of samples is large then large resources are needed for the computation. Thirdly, the Kullback Leibler distance is not applicable to more than two classes. (e.g. four models: children, old people, female, and male specific models are under the consideration for replacement by a general model). Since the Kullback Leibler distance in the model information can only be applied to exactly two models, the issues of more than two specific models need to be solved with new methods. Fourthly, the method does not allow for the replacement decision to be adjusted at run-time.

SUMMARY OF THE INVENTION

According to one aspect of the present invention there is provided a method for generating a recognition data model set comprising: receiving first and second class dependent data model sets based on corresponding first and second class dependent training data sets, each set of training data originating from a subset of the training data; receiving a class independent data model set based on all training data; wherein each data model set comprising a plurality of data models, each data model in one data model set having a corresponding data model in each of the corresponding other data model sets; comparing the fit of class data models to the training data to the fit of the corresponding class independent data model to the training data; and selecting, for all groups of corresponding data models, the group of corresponding class dependent data models or the corresponding class independent data model based on the relative fit and adding the selected data models or model to a final data model set. This allows a more precise determination of when a union of class dependent data models is better than a class independent model.

This aspect of the present invention addresses the above-mentioned shortcomings by measuring the fit between the trained data models and an ideal model inferred from all the training data.

Preferably the group of corresponding class dependent data models is selected when the difference in fit is over a threshold level. Using a threshold level allows a balance to be made between getting a better final model and the resource usage.

It is advantageous to select a limited size of the best fitting union of class dependent data models. Such limiting the size of the selected models allows the set creator to determine the size of the data model set and maximize the number of selected class dependent data models.

More preferably three or more class dependent data model sets are used.

Suitably the relative fit is determined by measuring the difference between a) the cross entropy of the class dependent data models and the training data and b) the cross entropy of the independent data model and the training data.

Preferably an ideal model of the training data is inferred from more training data than is used to derive the individual data models. Using an ideal model of training data provides increased accuracy when selecting data models. Any errors in the original training data can be double checked with the independent ideal model. Any biases present at run-time can be compensated by using this run-time data to influence the determining operation.

One advantageous method of calculating the cross entropy of the class dependent data models and the training data or ideal model is by averaging the logarithm likelihoods of each class dependent data model with the regards to the training data or ideal model. A differently advantageous way of calculating the cross entropy of the class dependent data model and the training data or ideal model is by calculating the logarithm likelihood of the combined class dependent data models with regards to the training data or ideal model.

The foregoing and other features, utilities and advantages of the invention will be apparent from the following more particular description of various embodiments of the invention as illustrated in the accompanying drawings.

DETAILED DESCRIPTION OF THE INVENTION

The following description details how the present invention is employed to provide two embodiments of cross entropy difference computation for effective class-independent model replacement in speech and/or voice recognition. Other applications of the present invention utilizing the general principles set forth herein are also contemplated. Thus, the present invention should not be considered limited to the configurations shown and discussed herein. Furthermore, the invention is not limited to speech recognition but can be applied to any recognition data including: finger print recognition data; handwriting recognition data; genetic recognition data and face recognition data.

Figure 2:
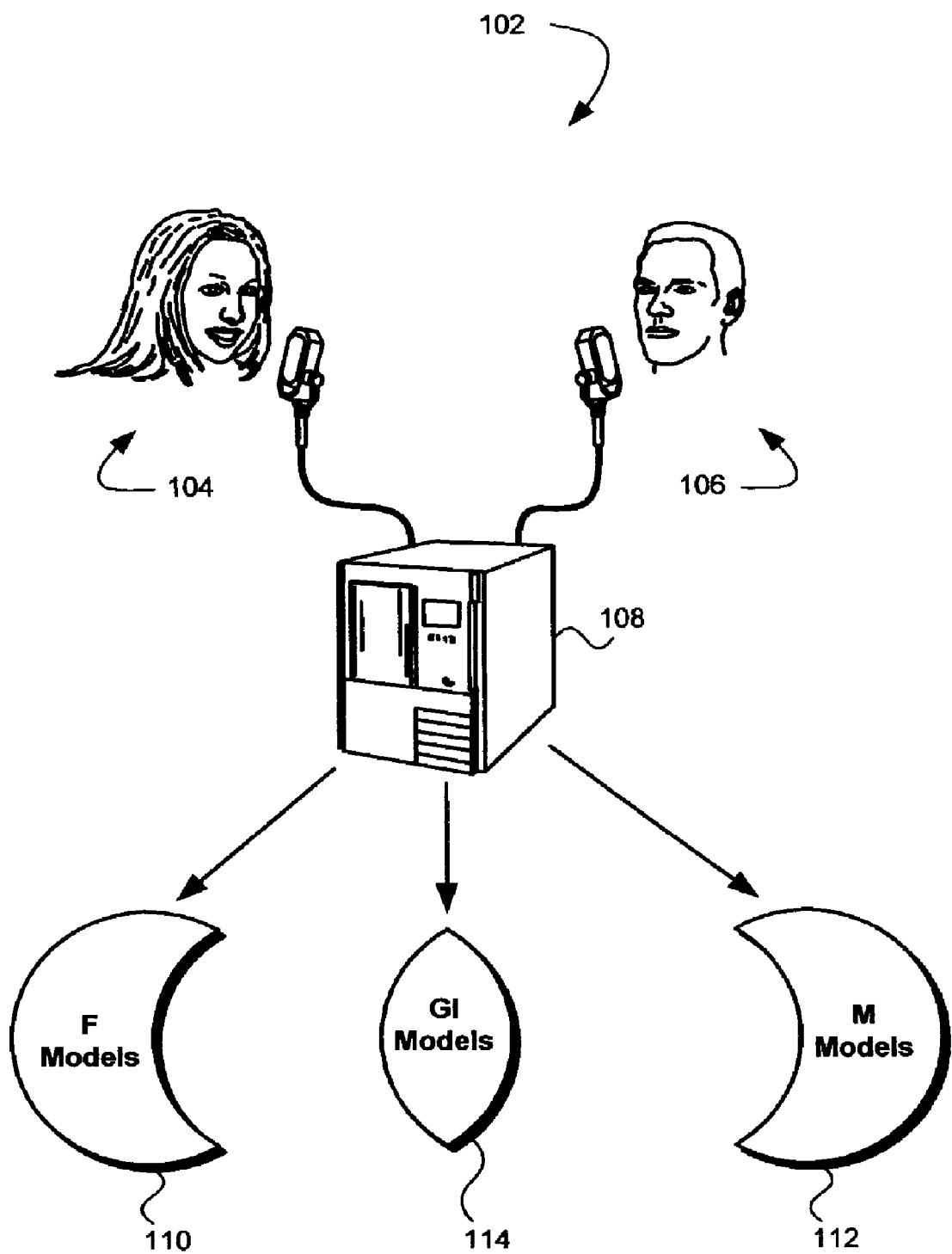
FIG. 2 shows an exemplary network environment embodying the present invention.

In FIG. 2, an exemplary model creation system 102 is shown. The system makes use of training data to derive trained allophone models.

The system 102 includes two allophone classes: female training data class 104 (represented by a female head) and male training data class 106 (represented by a male head) provided to a processor 108. Each training data class contains thousands of recorded samples of allophones. Each training data class is identified by its allophones and whether it comes from a male speaker or a female speaker. In a particular embodiment of the invention, training data class 104 and training data class 106 are configured to provide a broad representation of the allophones required for speech recognition.

The processor 108 models the allophones in the training data classes 104 and 106 by quantifying various features from the data. These features may include the data's signal frequencies, intensities, and other characteristics. In a particular embodiment of the invention, 39 features are measured by the processor 108 for each data sample. All the measured features for a given allophone have a particular probability density distribution and the processor 108 models these features using Gaussian mixture models (GMMs). The processor 108 creates a female allophone model for each allophone; collectively the female allophone models 110 are based solely on the female training data class 104. Male allophone models 112 are based solely on the male training data class 106.

In fact, the speaker classes can be more than just female and male. For example, in some systems, there may be classes representing children and the elderly as well. In these cases, FIG. 2 can be generalised to a multi-class scenario with an arbitrary number of classes. In all situations, there are both class independent allophone models and class specific allophone models.

Figure 1:
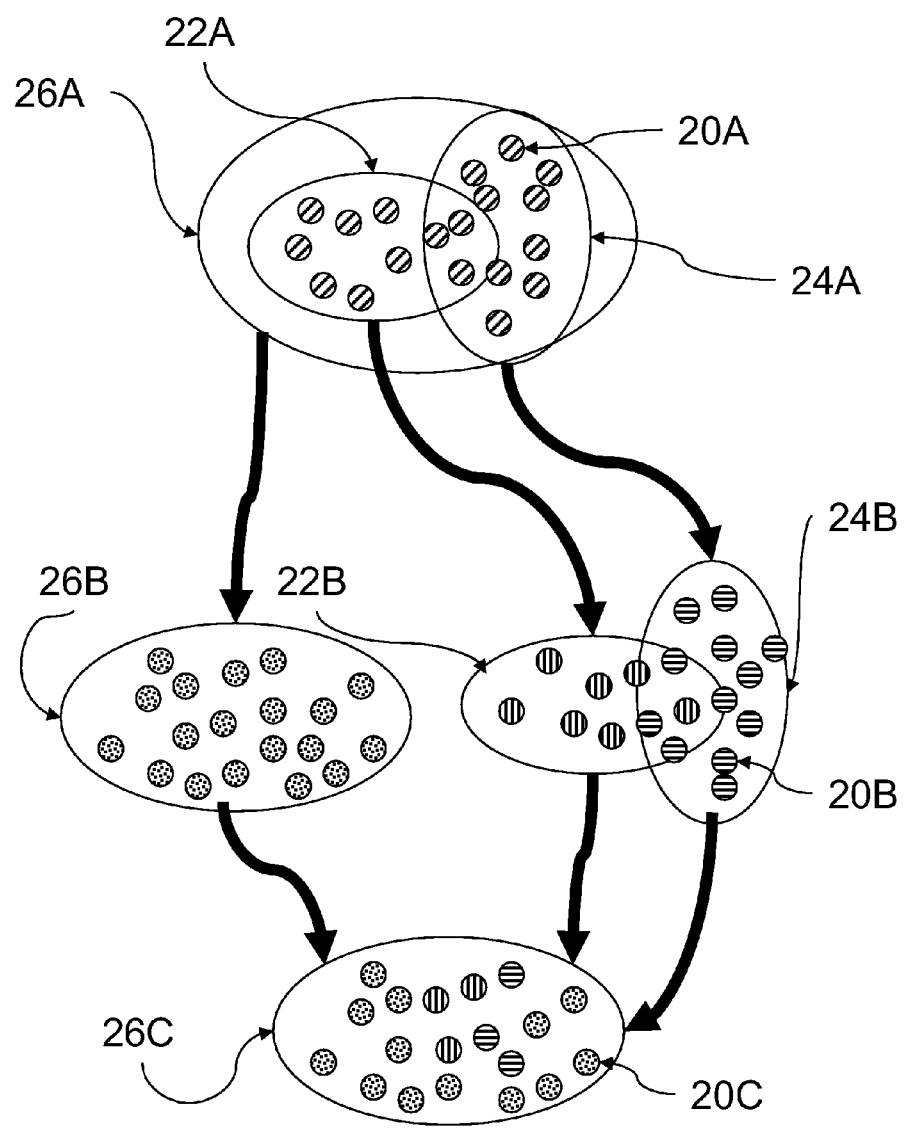
FIG. 1 shows two sets of training data and corresponding and resulting data model set for both the prior art and the present embodiment.

The processor 108 additionally decides whether a cross entropy difference between the class specific allophone models (110 and 112) and the class independent allophone model 114 for each allophone is significant, that is, above a user defined threshold. Although there are many class independent allophone models very different in cross entropy from the class-specific allophone models, there are also many class-independent allophone models with very similar cross entropy to class-specific allophone models. One major cause of the cross entropy similarity is that there are many allophones that are very similar when spoken by different speaker classes. For example, silence and some unvoiced consonants are similar across all speakers. However, the class specific allophone model cross entropy similarity across all speakers does not mean the cross entropy of the class independent allophone model must be similar to those of the class specific models. Deficits in model structure, training methods, and other factors can generate a cross entropy difference. On the other hand, even if there is no similarity between the class specific allophone models, a combination of all class specific models used in recognition can be very similar to the class independent model. Depending on system configuration, many other allophones can exhibit gender independent qualities. With reference to FIG. 1, the model data sets can be visualized as a Venn diagram of two overlapping sets, with one set representing a female data set and the other a male data set. Individual data models are shown within the data model sets. The overlapping portion of the sets shows data models that are gender independent.

The processor 108 does not include in a final allophone model set separate female data models 110 and male data models 112 that are determined to have insignificant differences in cross entropy from the gender independent models. The final allophone model contains female allophone models 110 derived from female training data 104, male allophone models 112 derived from male training data 106, and gender independent allophone models 114 derived from both the female and male training data 104 and 106, wherein the female allophone models 110 and male allophone models 112 are different enough from the gender-independent model to make the advantage of their preciseness outweigh the disadvantage of the memory use.

The allophone model creation system 102 of the embodiments beneficially reduces the size and complexity of an allophone model set needed to be stored and searched during speech recognition.

Figure 3:
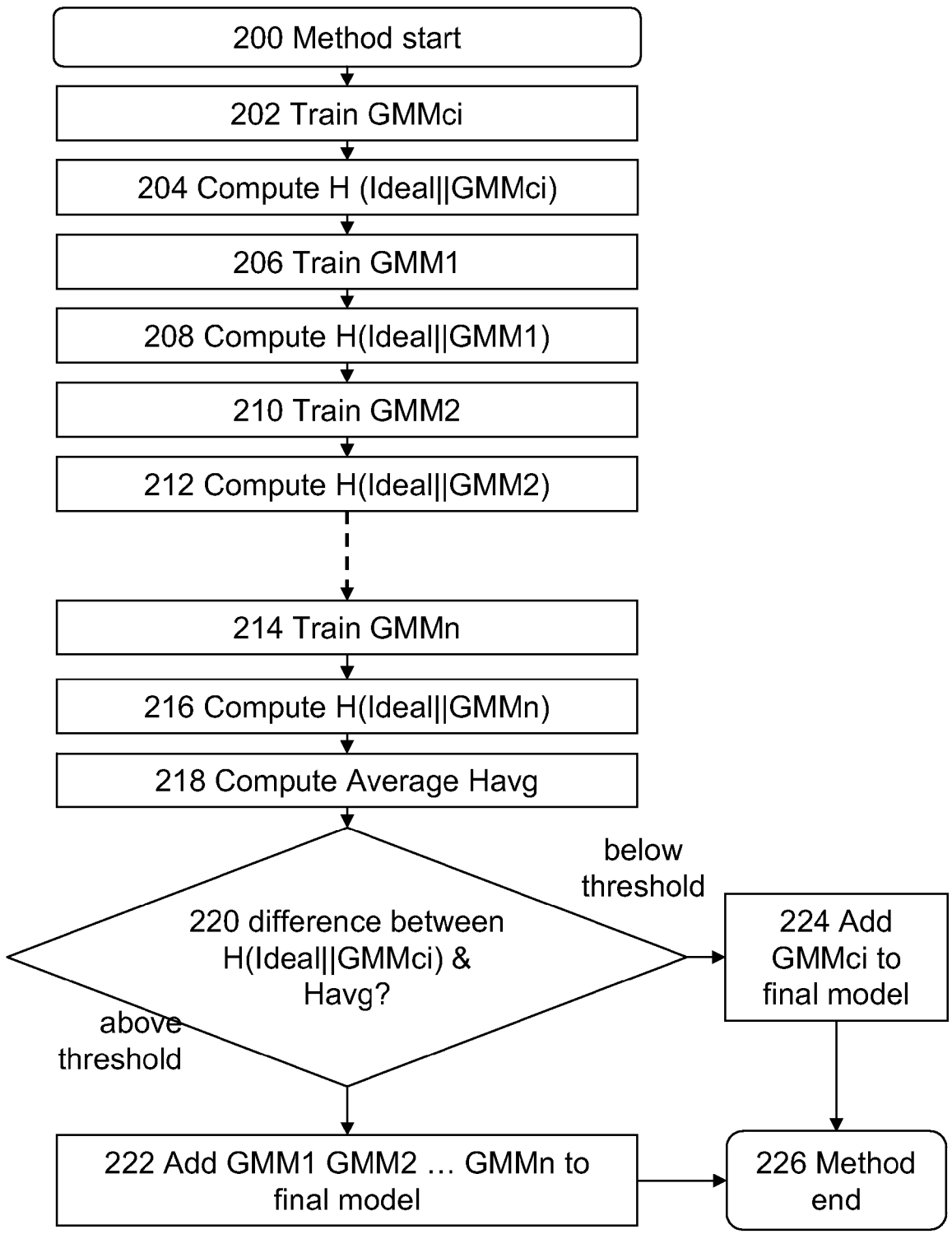
FIG. 3 shows a first process for generating a data model set.

In FIG. 3, there is presented a first embodiment for generating an acoustic data model set based on the difference of cross entropy between an ideal model that can generate the training data and class independent allophone models and the average value of a ideal model that can generate training data to a gender specific allophone model. It should be remarked that the logical operations shown may be implemented a) as a sequence of computer executed steps sunning on a computing system and/or b) as interconnected machine modules within the computing system. The implementation is a matter of choice dependent on the performance requirements of the system implementing the invention. Accordingly, the logical operations making up the embodiments of the present invention described herein are referred to alternatively as operations, steps, or modules.

Process 200 begins with training operation 202. During this operation, class independent Gaussian mixture models (GMMci) are approximated from all class training data, e.g. from both female and male training data. In this embodiment, training data is used to generate an Ideal model. In this embodiment it is simply the collection of all training data but in other embodiments additional training data can be used to create more ideal model of the training data. The ideal model can also be an equation. Once the class independent models (GMMci) are created and trained in the training operation, control passes to the cross entropy computation operation 204 between the Ideal model and the class independent models, i.e. compute H(Ideal||GMMci). (Entropy is a measure of the order of a system (e.g. Boltzmann's equation is p times log (p)) and cross entropy is a measure of the order between two systems (Boltzmann's equation for cross entropy is q times log(p)). The cross entropy in this embodiment is defined in terms of relationship between the training data (e.g. q) and the data models (e.g. p) that are derived from the training data. In the present embodiment, the Ideal model is a real probability distribution model that can generate the training data. A gaussian mixture model is also used to approximate the Ideal model structure and a difference between the Ideal model of the training data and the data models derived from the training data can be estimated. Cross entropy between the Ideal model generating the training data and a class k model is represented by H(Ideal||GMMk)=.intg.sub.xIdeal(x)log(GMMk(x))dx. Ideal(x) is the real probability distribution model of the training data. GMMk(x) is the estimated gaussian mixture model, and x is the speech data vector. Since it is very difficult to get Ideal(x) with the current technologies, cross entropy H(Ideal||GMMk) is calculated as the average of the logarithm likelihood of GMMk (x) that is $$1ni = 1n\ log(GMMk(xi))$$

as n tends to infinity, where there are n speech data vectors and xi is the n-th data point. It can be shown that as the amount of training data increases the average value of logarithm likelihood approaches the cross entropy and therefore with enough training data the cross entropy between the Ideal model and the class independent model can be approximated by the averaging of logarithm likelihood of the class independent model. Note that if the proportion of female and male training data is the same as the real female and male occurrence probabilities in recognition, cross entropy between the Ideal model and the approximating trained gender independent model is equivalent to the average of the cross entropy of ideal female model to the approximating trained gender independent model and the cross entropy of ideal male model to the approximating trained gender independent model.

In the first and second embodiments the number of class specific data sets is taken as N. Similarly, at training operations, N class specific models are trained using just the class specific data, e.g. male models are created and trained using just the male training data. After a first class specific model GMML is trained 206, the cross entropy between an Ideal model and the class specific model is calculated 208 to compute H(Ideal//GMM1) as the average of the logarithm likelihood of the class specific Gaussian mixture model. Similarly, H(Ideal//GMM1) represents the difference between the Ideal and the class specific Gaussian mixture model. It is noted that in averaging, the real data vectors used can be either from all the classes or from the specific class. The former means the class independent model is used for cross entropy measurement; the latter means the class specific model is used for cross entropy measurement. It is also noted that all Gaussian mixture model training operations following cross entropy computation operations may be performed in sequence or in parallel, depending on system configuration.

A second GMM2 and subsequent GMMn class specific models are trained in steps 210, 214 and the cross entropies calculated 212 to compute H(Ideal//GMM2) 216 to compute H(Ideal//GMMn).

After all cross entropy computations for class specific models are completed, control passes to the averaging operation 218 for class specific models. The average of the cross entropy is calculated across all the class specific models. If the occurrence probabilities of all classes in recognition are known, these occurrence probabilities are to be used in averaging $$Havg = \sum_{k=1}^{N} \gamma_k H(\text{Ideal}||GMMk),$$

in which $\gamma_k$ is the occurrence probability of class k; Otherwise, we use arithmetic $$_{average}Havg = \sum_{k=1}^{N} \frac{1}{N} H(\text{Ideal}||GMMk)$$

Then control passes to the determining operation. In the determining operation, the average cross entropy across all class dependent models are compared 220 with the cross entropy of the class independent model to determine if their differences are significant, that is, above a user defined threshold. The change of cross entropy can be regarded as the difference in fit between a) the Ideal model and the class independent model and b) the Ideal model and the class specific models.

In a preferred embodiment, the decision whether the change of Cross entropies between the class independent model and average value o f class specific models is significant is based on a maximum allowable number of GMMs in the system. The change of cross entropies a£ all allophones are computed and sorted and an upper limit of total number of or size of GMMs is set. The number of total GMMs is initially the total number of class specific GMMs. Starting with the smallest change of cross entropy, the class independent GMMs replace the class specific GMMs for the allophone in the ascending order of change of cross entropy by adding the GMMs to a final model (step 222). The process stops 226 when the total number of GMMs reaches the upper limit. All the allophones involved in replacement before stopping are considered as having an insignificant change in cross entropy.

For those allophones for which the determining operation returns an evaluation that the change of cross entropy is insignificant, control passes to the adding operation, where the class independent models (GMMci) for these allophones are added 224 to the final model.

For those allophones for which the determining operation returns an evaluation that the change of cross entropy is significant, control again passes to the adding operation, where separate class specific models are added to the final model. The process ends after examination of all the allophone models is completed.

Figure 4:
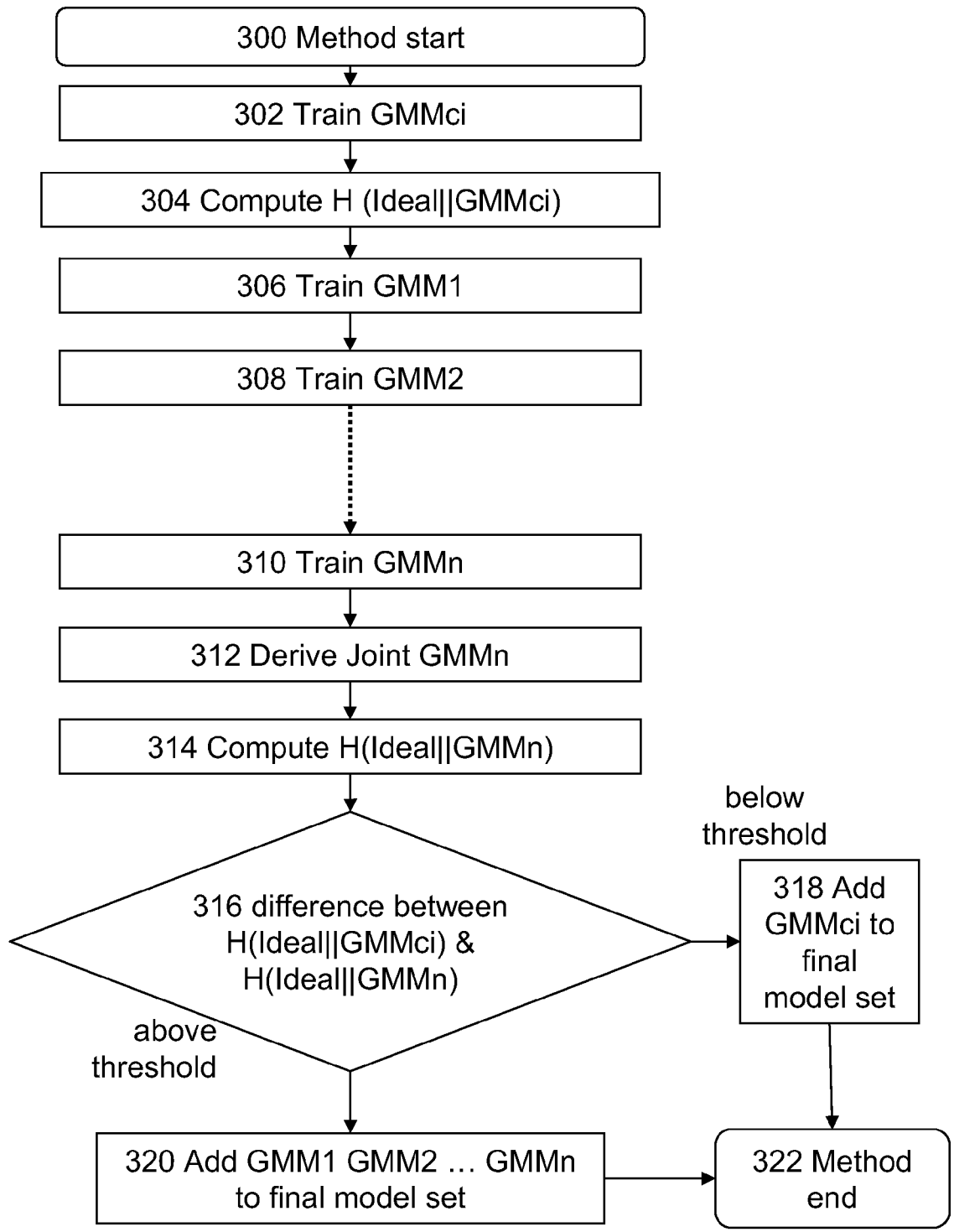
FIG. 4 shows a second process for generating a data model set.

In FIG. 4, a second process 300 for generating final GMMs is presented. This process calculates the difference in cross entropy between a) the Ideal model of the training data to a class independent model and b) the Ideal model of the training data to a joint model for all class specific data models. It should be remarked that the logical operations shown may be implemented a) as a sequence of computer executed steps running on a computing system and/or b) as interconnected machine modules within the computing system. The implementation is a matter of choice dependent on the performance requirements of the system implementing the invention. Accordingly, the logical operations making up the embodiments of the present invention described herein are referred to alternatively as operations, steps, or modules.

The process 300 begins with the training operation 302. During this operation, class-independent Gaussian Mixture Models (GMMci) are approximated from all class training data, e.g. from both the female and male training data.

Once the class independent models (GMMci) are created and trained in the training operation, control passes to cross entropy computation operation 304 between the Ideal model of the training data and the class independent models. Similar to the first part of the invention, the computation averages the logarithm likelihood of GMMci(x).

There are N class-specific gaussian mixture models, Similarly, in the training operations 306, 308, 310, N class specific models are trained using just the class specific data, e.g. male models are created and trained using just the male training data. After all class specific models are trained, a joint GMM is derived 312 based on all the class specific models. One embodiment of the derivation is to pool all class specific GMMs together, with the prior of each gaussian divided by N, the number of classes. H(Ideal||GMMn) the cross entropy between a Ideal model and the joint model is calculated 314 by averaging the logarithm likelihood of the joint gaussian mixture model with training data from all classes. Similarly, H(Ideal||GMMn) represents the difference in fit between a) the ideal models and the class independent models and b) the Ideal models and the class specific models.

Then control passes to the determining operation 316.

In the determining operation, the cross entropy of the joint class dependent models is compared with the cross entropy of the class independent model to determine if their differences are significant. The change of cross entropy can he regarded as the mismatch between the class independent model and the class specific models.

In the preferred embodiment the decision is based on a threshold value of the change in cross entropies. Alternatively, the decision whether the change of cross entropies between the class independent model and average value of class specific models is significant may be based on a maximum allowable number of GMMs in the system, similar to the first part of the invention.

For those allophones for which the determining operation returns an evaluation that the change of cross entropy is insignificant, control passes to the adding operation 318, where the class independent models (GMMci) for these allophones are added to a final data model set.

For those allophones for which the determining operation returns an evaluation that the change of cross entropy is significant, control passes to the adding operation 320, where separate class specific models are added to the final model set. The process ends (step 322) after examination of all the allophone models is completed.

The foregoing description of the invention has been presented for purposes of illustration and description. It is not intended to be exhaustive or to limit the invention to the precise form disclosed, and other modifications and variations may be possible in light of the above teachings. For example, those skilled in the art may apply the teaching of the present invention to optical character recognition (OCR) systems. The embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The preferred embodiment of the present invention in the form of a method or logic arrangement thus advantageously addresses the problem of providing a technological means for generating a recognition model, preferably with minimal additional resource use. It will be clear to one of ordinary skill in the art that certain of the steps shown here in sequential fashion as they are numbered may in fact be processed concurrently, and that certain steps may be required to wait for the completion of other operations, and that the sequence shown is merely exemplary of the processing that may be performed by an embodiment of the present invention.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of a computer implemented method of deploying a service comprising steps of deploying computer program code operable to, when deployed into a computer infrastructure and executed thereon, cause the computer system to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

The invention claimed is:

1. A method in a data processing system for generating a recognition data model set comprising:
   a computer receiving a first group of class dependent data models sets based on a corresponding second group of class training data sets, each set of training data originating from a subset of all training data;
   the computer receiving a class independent data model set based on all training data, each data model set comprising a plurality of data models, wherein each data model in one data model set is part of a group of corresponding data models from other data model sets;
   the computer comparing a fit of each group of corresponding class dependent data models to training data and the fit of a corresponding independent data model to the training data, wherein the fit is determined by measuring a difference between a) a first cross entropy of corresponding class dependent data models and the training data and b) a second cross entropy of a corresponding class independent data model and the training data;
   the computer, responsive to determining that a difference between the first cross entropy and the second cross entropy is insignificant, adding the corresponding class independent data model to a final data model set; and
   the computer, responsive to determining that the difference between the first cross entropy and the second cross entropy is significant, adding the corresponding class dependent data models to the final data model set.

2. A method according to claim 1 comprising the computer selecting a group of corresponding class dependent data models when a difference in fit is over a threshold level.

3. A method according to claim 1 further comprising the computer selecting a limited size of a best fitting union of class dependent data models.

4. A method according to claim 1 wherein three or more class dependent data model sets are used.

5. A method according to claim 1 further comprising:
   selecting, for all groups of corresponding data models, a group of corresponding class dependent data models or the corresponding independent data model based on a fit comparison and adding a selected data model or models to the final data model.

6. A method according to claim 5 wherein the cross entropy of the corresponding class dependent data and the training data is calculated by averaging a logarithm likelihood of each corresponding class dependent data model with regards to the training data.

7. A method according to claim 5 wherein the cross entropy of the corresponding class dependent data models and the training data is calculated by calculating a logarithm likelihood of combined corresponding class dependent data models with regards to the training data.

8. A method according to claim 1 wherein the training data used in a comparison includes training data not used to derive the data models or comprises an ideal model of training data.

9. A computer system for generating a recognition data model set comprising:
   one or more processors, one or more computer-readable memories, and one or more computer-readable, tangible storage devices;
   program instructions, stored on at least one of the one or more computer-readable, tangible storage devices for execution by at least one of the one or more processors via at least one of the one or more computer-readable memories, to base a first group of class dependent data models sets on a second group of corresponding class dependent training data sets, each set of training data originating from a subset of all training data;
   program instructions, stored on at least one of the one or more computer-readable, tangible storage devices for execution by at least one of the one or more processors via at least one of the one or more computer-readable memories, to base a class independent data model set on all training data, each data model set comprising a plurality of data models, wherein each data model in a data model set is part of one group of corresponding data models from other data model sets;
   program instructions, stored on at least one of the one or more computer-readable, tangible storage devices for execution by at least one of the one or more processors via at least one of the one or more computer-readable memories, to compare a fit of each group of corresponding class dependent data models to training data and the fit of a corresponding independent data model to all the training data, wherein the fit is determined by measuring a difference between a first cross entropy of corresponding class dependent data models and the training data and a second cross entropy of a corresponding class independent data model and the training data;
   program instructions, stored on at least one of the one or more computer-readable, tangible storage devices for execution by at least one of the one or more processors via at least one of the one or more computer-readable memories, to add, responsive to determining that a difference between the first cross entropy and the second cross entropy is insignificant, the corresponding class independent data model to a final data model set; and program instructions, stored on at least one of the one or more computer-readable, tangible storage devices for execution by at least one of the one or more processors via at least one of the one or more computer-readable memories, to add, responsive to determining that the difference between the first cross entropy and the second cross entropy is significant, the corresponding class dependent data models to the final data model set.

10. The computer system according to claim 9 wherein program instructions, stored on at least one of the one or more computer-readable, tangible storage devices for execution by at least one of the one or more processors via at least one of the one or more computer-readable memories, to select the group of corresponding class dependent data models when a difference in fit is over a threshold level.

11. The computer system according to claim 9 further comprising:
program instructions, stored on at least one of the one or more computer-readable, tangible storage devices for execution by at least one of the one or more processors via at least one of the one or more computer-readable memories, to select a limited size of the best fitting union of class dependent data models.

12. The computer system according to claim 9 wherein three or more class dependent data model sets are used.

13. The computer system according to claim 9 further comprising:
program instructions, stored on at least one of the one or more computer-readable, tangible storage devices for execution by at least one of the one or more processors via at least one of the one or more computer-readable memories, to select, for all groups of corresponding data models, the group of corresponding class dependent data models or the corresponding independent data model based on the fit; and program instructions, stored on at least one of the one or more computer-readable, tangible storage devices for execution by at least one of the one or more processors via at least one of the one or more computer-readable memories, to add a final data model set or model to selected data models.

14. The computer system according to claim 13 wherein the cross entropy of the corresponding class dependent data models and the training data is calculated by averaging a logarithm likelihoods of each corresponding class dependent data model with regards to the training data.

15. The computer system according to claim 13 wherein the cross entropy of the corresponding class dependent data models and the training data is calculated by calculating a logarithm likelihood of combined corresponding class dependent data models with regards to the training data.

16. The computer system according to claim 9 wherein the training data is derived from a different training data set than that used to derive the individual data models.

17. A computer program product for generating a recognition data model set comprising:
one or more computer-readable, tangible storage devices;
program instructions, stored on at least one of the one or more computer-readable, tangible storage devices, to receive first and second class dependent data models sets based on corresponding first and second class dependent training data sets, each set of training data originating from a subset of all the training data;
program instructions, stored on at least one of the one or more computer-readable, tangible storage devices, to receive a class independent data model set based on all training data, each data model set comprising a plurality of data models, wherein each data model in one data model set is part of a group of corresponding data models from other data model sets;
program instructions, stored on at least one of the one or more computer-readable, tangible storage devices, to compare a fit of each group of class specific data models to training data and the fit of a corresponding independent data model to the training data, wherein the fit is determined by measuring a difference between a first cross entropy of corresponding class dependent data models and the training data and a second cross entropy of a corresponding class independent data model and the training data;
program instructions, stored on at least one of the one or more computer-readable, tangible storage devices, to add, responsive to determining that a difference between the first cross entropy and the second cross entropy is insignificant, the corresponding class independent data model to a final data model set; and
program instructions, stored on at least one of the one or more computer-readable, tangible storage devices, to add, responsive to determining that the difference between the first cross entropy and the second cross entropy is significant, the corresponding class dependent data models to the final data model set.

18. The computer program product of claim 17, further comprising:
program instructions, stored on at least one of the one or more computer-readable, tangible storage devices, to select, for all groups of corresponding data models, a group of corresponding class dependent data models, or the corresponding independent data model, based on the fit; and
program instructions, stored on at least one of the one or more computer-readable, tangible storage devices, to add a final data model set or model to selected data models.

* * * * *